(12) United States Patent
Eslinger et al.

(10) Patent No.: US 6,289,454 B1
(45) Date of Patent: Sep. 11, 2001

(54) MEMORY CONFIGURATION WHICH SUPPORT MULTIPLE CRYPTOGRAPHICAL ALGORITHMS

(75) Inventors: Gregory Clayton Eslinger, Phoenix; Joseph Victor Wallace, Tempe, both of AZ (US)

(73) Assignee: VLSI Technology, Inc., San Jose, CA (US)

(*) Notice: Subject to any disclaimer, the term of this patent is extended or adjusted under 35 U.S.C. 154(b) by 0 days.

(21) Appl. No.: 09/107,024

(22) Filed: Jun. 29, 1998

(51) Int. Cl.[7] ............................................. H04L 9/14
(52) U.S. Cl. ..................... 713/189; 713/200; 380/44; 380/30
(58) Field of Search ................................ 713/189, 200; 380/264, 44, 30

(56) References Cited

U.S. PATENT DOCUMENTS 5,987,131 * 11/1999 Clapp ........................................ 380/21
6,088,800 * 7/2000 Jones et al. ............................ 713/189
6,088,802 * 7/2000 Bialick et al. ........................ 713/200

\* cited by examiner

*Primary Examiner*—Gilberto Barrón, Jr.
*Assistant Examiner*—Jeff Leaning
(74) *Attorney, Agent, or Firm*—Douglas C. Weller

(57) ABSTRACT

Multiple cryptographic algorithms are utilized on a single integrated circuit. In a single special memory, a plurality of values are stored. The values are used for a first cryptographic algorithm and are used for a second cryptographic algorithm. At least one value from the plurality of values is used both for the first cryptographic algorithm and for the second cryptographic algorithm. When performing a first operation for the first cryptographic algorithm, first values from the plurality of values are used. The first values include the value used both for the first cryptographic algorithm and for the second cryptographic algorithm. When performing a second operation for the second cryptographic algorithm, second values from the plurality values are used. The second values also include the value used both for the first cryptographic algorithm and for the second cryptographic algorithm.

16 Claims, 6 Drawing Sheets

MEMORY CONFIGURATION WHICH SUPPORT MULTIPLE CRYPTOGRAPHICAL ALGORITHMS

BACKGROUND

The present invention concerns the encrypting and the decrypting of data within a computing system and pertains specifically to memory configurations which support use of multiple cryptographic algorithms.

In order to protect against theft or misuse, secure information within a computing system can be encrypted before being transferred over a network or other medium. When received, the secure information is decrypted before being used. The RSA cryptographic algorithm and the Diffie-Hellman cryptographic algorithm are examples of public key algorithms that utilize both public and private key components to perform key exchanges. Each of these cryptographic algorithms requires private components that are programmed into the system memory.

For example, in the Diffie-Hellman algorithm, all users in the computing system agree on a common large prime number n, and second number g, such that g is primitive mod n. The selected values for n and g are not kept secret. Each user in the system then generates a large random integer x, which is the private key. The associated public key, X, is generated the following formula:

$$X = g^x \bmod n$$

Two users can compute a shared secret key, k, by exchanging public keys, X and Y and applying the following formula:

$$k = Y^x \bmod n$$
$$k' = X^y \bmod n$$

where $$k = k' = g^{xy} \bmod n$$

Unlike the Diffie-Hellman algorithm, which is a key exchange algorithm, the RSA cryptographic algorithm does not require users to belong to a "system" and have knowledge of predetermined values. Each user determines his own public and private key pairs. To do this two randomly generated large prime numbers p and q are kept secret. The two randomly generated large prime numbers p and q are used to generate a public key n according to the following formula:

$$n = p * q$$

The numbers p and q are also, along with a public key component e, used to generate a private key d which also must be kept secret. The formula used to generate private key d is as follows:

$$d = e^{-1} \bmod ((p-1)(q-1)).$$

To encrypt a message m to produce an encrypted message c, the sender would use the receivers public key in the following formula:

$$c = m^e \bmod n$$

To decrypt the encrypted message c to produce the original message m, the receiver would use his private key in the following formula:

$$m = c^d \bmod n.$$

The various key components can be stored in a one time programmable memory (OTP) in a computer system allowing permanent access within the system. This also facilitates the ability of a computer system to provide some protection against undesired copying of the key components from an integrated circuit chip on which the key components are stored.

For example, for the Diffie-Hellman algorithm, the private key, x, is stored in 512 bits of a one-time programmable memory. This number is kept private. The same one-time programmable memory can also be used to store the large prime number n and the second number g. For example, 512 bits of the one-time programmable memory are used to store the number n and 32 bits of the one-time programmable memory are used to store the number g.

In order to support 1024 bit RSA cryptographic algorithm, the length of the value p and of the value q are half the 1024 bit length of n. Thus the values p and q are each 512 bits in length and are each stored using 512 bits in memory. Additionally, the public key component e is also stored using 32 bits of memory. It is advantageous to store p and q rather than storing the secret key d in memory. This is because it is computationally faster to perform the exponentiations utilizing the Chinese Remainder Theorem which use p and q rather than using d.

For additional information on the RSA Algorithm and the Diffie-Hellman algorithm, see Bruce Schneier, *Applied Cryptography*, John Wiley & Sons, Inc., 1996, pp. 466–469, 513–514.

SUMMARY OF THE INVENTION

In accordance with the preferred embodiment of the present invention, multiple cryptographic algorithms are utilized on a single integrated circuit. In a single special memory, a plurality of values are stored. The values are used for a first cryptographic algorithm and are used for a second cryptographic algorithm. At least one value from the plurality of values is used both for the first cryptographic algorithm and for the second cryptographic algorithm. When performing a first operation for the first cryptographic algorithm, first values from the plurality of values are used. The first values include the value used both for the first cryptographic algorithm and for the second cryptographic algorithm. When performing a second operation for the second cryptographic algorithm, second values from the plurality values are used. The second values also include the value used both for the first cryptographic algorithm and for the second cryptographic algorithm.

In one preferred embodiment of the present invention, the first cryptographic algorithm is the RSA cryptographic algorithm and the second cryptographic algorithm is the Diffie-Hellman cryptographic algorithm. The special memory is, for example, a 2048-bit one time programmable memory with half the memory being used to store private values and half the memory being used to store public values. Access to the memory locations used to store private values is restricted in order to preserve secrecy of the private values.

The first and second operations can be, for example, obtaining a public key for either cryptographic algorithm, obtaining a private key for either cryptographic algorithm, performing an encryption using either cryptographic algorithm and/or performing a decryption using either cryptographic algorithm.

The present invention allows implementation of an integrated circuit chip that supports more than one public-key algorithm security system. This approach allows each chip to be programmed without regard to the end application and it offers versatility in the marketplace by having a single chip address multiple public key applications. The OTP memory configurations allow for a single programming algorithm to be used to support multiple public key algorithms applications. Partitioning the OTP into public and private segments as well as prime and non-prime segments allows for each public key algorithm to use different portions of the OTP based upon their own requirements.

The use of the multiple public key OTP memory programming configuration facilitates implementation of multiple public key applications. In development environments this is extremely valuable and in production systems it will provide flexibility and economic advantages. Providing cryptographic primitives (on chip software) which perform generic exponentiation and math intensive computations on either an embedded processor or on dedicated hardware also makes the device more versatile. Again, regardless of the public key algorithm used, the primitives can be used to perform any public key algorithm and the primitives can also be customized via downloadable configuration tables to retrieve the appropriate data from the correct area of the OTP memory.

DESCRIPTION OF THE PRIOR ART

Many existing security processors utilize a one-time-programmable (OTP) memory which stores each chip's unique identity. This identity is generally in the form of public and private components associated with a public key algorithm. For instance, in the RSA cryptographic algorithm or the Diffie-Hellman cryptographic algorithm, the private key component is associated with an accompanying public key. Regardless of the public key algorithm used, the private component is programmed into the OTP memory prior to the part being put into service and depending upon the algorithm used, the private components have varying requirements in terms of length and primality. The parts are programmed for a specific algorithm (e.g., the RSA cryptographic algorithm or the Diffie-Hellman cryptographic algorithm) and the programming algorithm depends upon the key management scheme being used.

Figure 1:
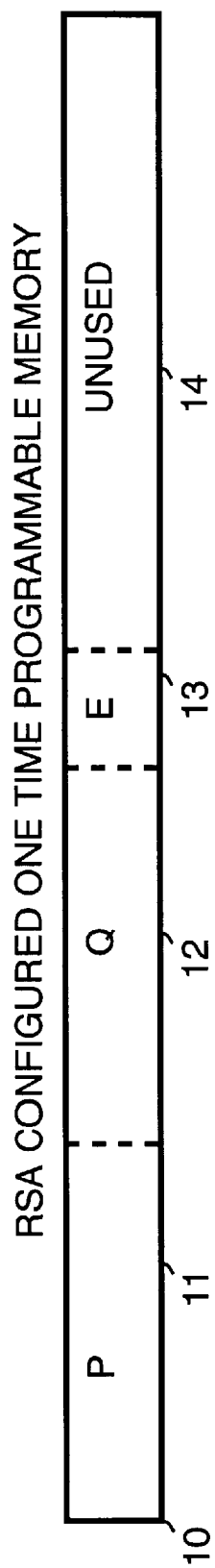
FIG. 1 shows a one time programmable memory configured to stored values for performance of the RSA cryptographic algorithm in accordance with the prior art.

For example, FIG. 1 shows a one-time-programmable (OTP) memory 10 configured to stored values for performance of the RSA cryptographic algorithm. A 512-bit section 11 of OTP memory 10 is used to store randomly generated large prime number p. A 512-bit section 12 of OTP memory 10 is used to store randomly generated large prime number q. A 32-bit section 13 of OTP memory 10 is used to store public key component e. Additionally, an unused section 14 of OTP memory 10 consists of 992 bits, for example, when the total length of OTP memory 10 is 2048 bits.

Figure 2:
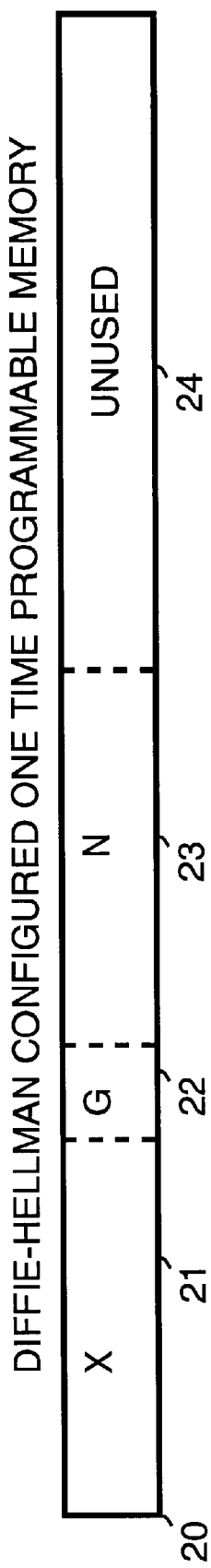
FIG. 2 shows a one time programmable memory configured to stored values for performance of the Diffie-Hellman cryptographic algorithm in accordance with the prior art.

FIG. 2 shows a one-time-programmable (OTP) memory 20 configured to stored values for performance of the Diffie-Hellman cryptographic algorithm. A 512-bit section 21 of OTP memory 20 is used to store large random integer x. A 32-bit section 22 of OTP memory 20 is used to store the number g. A 512-bit section 23 of OTP memory 20 is used to store large prime number n. Additionally, an unused section 24 of OTP memory 20 consists of 992 bits, for example, when the total length of OTP memory 20 is 2048 bits.

DESCRIPTION OF THE PREFERRED EMBODIMENT

Figure 3:
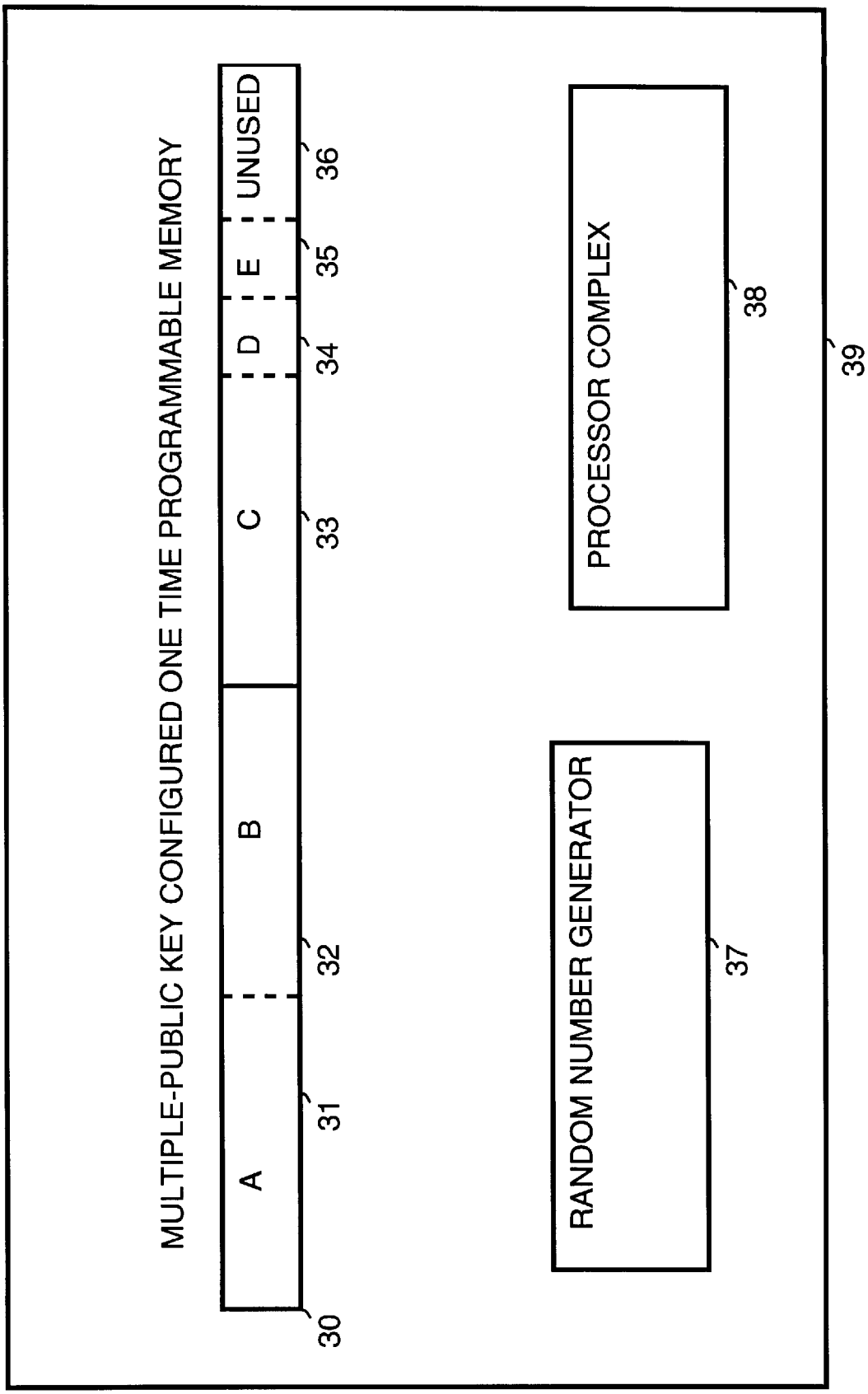
FIG. 3 shows a one time programmable memory set-up configured to store values for performance of both the RSA cryptographic algorithm and the Diffie-Hellman cryptographic algorithm in accordance with a preferred embodiment of the present invention.

FIG. 3 shows integrated circuitry 39 which includes a one-time-programmable (OTP) memory 30 configured to support multiple cryptographic algorithms. The configuration shown supports both the RSA cryptographic algorithm and the Diffie-Hellman cryptographic algorithm.

A 512-bit section 31 of OTP memory 30 and a 512-bit section 32 of OTP memory 30 are private sections of OTP memory 30 which are programmed in such a matter that the private contents are not revealed outside integrated circuitry 39. Access to the private sections of OTP memory 30 is restricted in order to preserve secrecy of the private values stored therein.

A 512-bit section 33 of OTP memory 30, a 32-bit section 34 of OTP memory 30 and a 32-bit section 35 of OTP memory 30, are public sections of OTP memory 30. A 448 bit section 36 of OTP memory 30 is not used by the RSA cryptographic algorithm and the Diffie-Hellman cryptographic algorithm and thus is unused or reserved for other potential uses.

512-bit section 31 of OTP memory 30 is used to store a randomly generated large prime value a, which is used by the RSA cryptographic algorithm as randomly generated large prime number p. Randomly generated large prime value a, is also used by the Diffie-Hellman cryptographic algorithm as large random integer x. 512-bit section 32 of OTP memory 30 is used to store a randomly generated large prime value b, which is used by the RSA cryptographic algorithm as randomly generated large prime number q.

512-bit section 33 of OTP memory 30 is used to store a large prime value c, which is used by the Diffie-Hellman cryptographic algorithm as large prime number n. 32-bit section 34 of OTP memory 30 is used to store a value d, which is used by the Diffie-Hellman cryptographic algorithm as the number g. 32-bit section 35 of OTP memory 30 is used to store a value e, which is used by the RSA cryptographic algorithm as public key component e.

A random number generator 37 is used to generate random numbers such as randomly generated large prime value a and randomly generated large prime value b. A processor complex 38 is used to execute cryptographic primitives (on chip software) which perform generic exponentiation and math intensive computations. The processor complex utilizes, for example, an embedded processor and/or dedicated hardware to execute cryptographic primitives. Regardless of the public key algorithm used, the cryptographic primitives can be used to perform any public key algorithm and can also be customized via downloadable configuration tables to retrieve the appropriate data from the correct area of the OTP memory. The processor complex additionally includes other components such as read only memory (ROM) and random access memory (RAM) used for performing the required processing.

Figure 4:
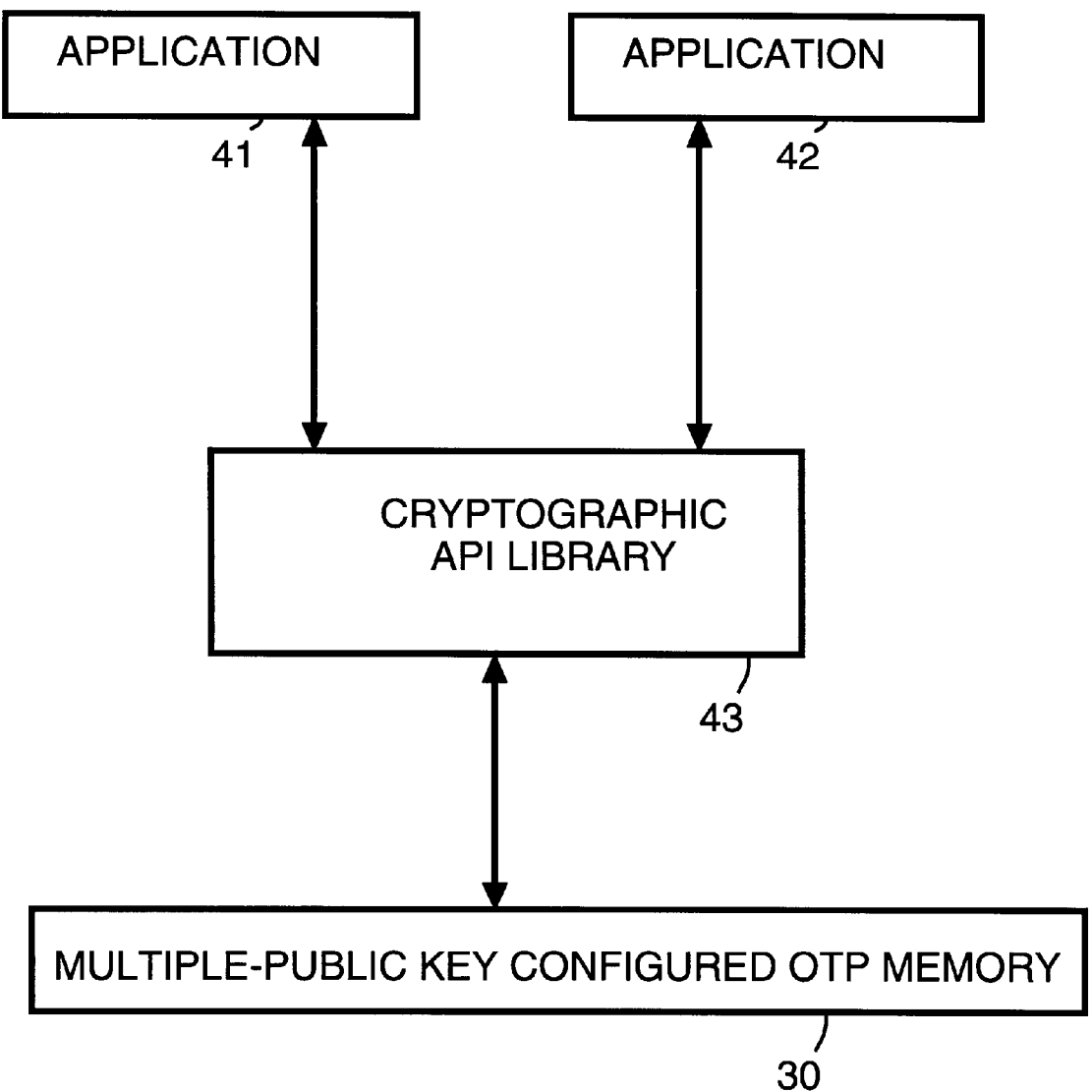
FIG. 4 illustrates one application using the RSA cryptographic algorithm and one application using the Diffie-Hellman cryptographic algorithm both utilizing values in the one-time programmable memory in accordance with a preferred embodiment of the present invention.

FIG. 4 illustrates an application 41 which uses the RSA cryptographic algorithm and an application 42 which uses the Diffie-Hellman cryptographic algorithm. Both of the cryptographic algorithms utilize values in one-time programmable memory 30.

For example, application 41, and application 42 make calls into a cryptographic application programmer interface (API) library 43. For example, cryptographic API library 43 includes primitives such as: Get_Public_Key (Algorithm, Pointer), Get_Private_Key (Algorithm, Pointer), Encrypt (Algorithm, Pointer) and Decrypt (Algorithm, Pointer).

Figure 5:
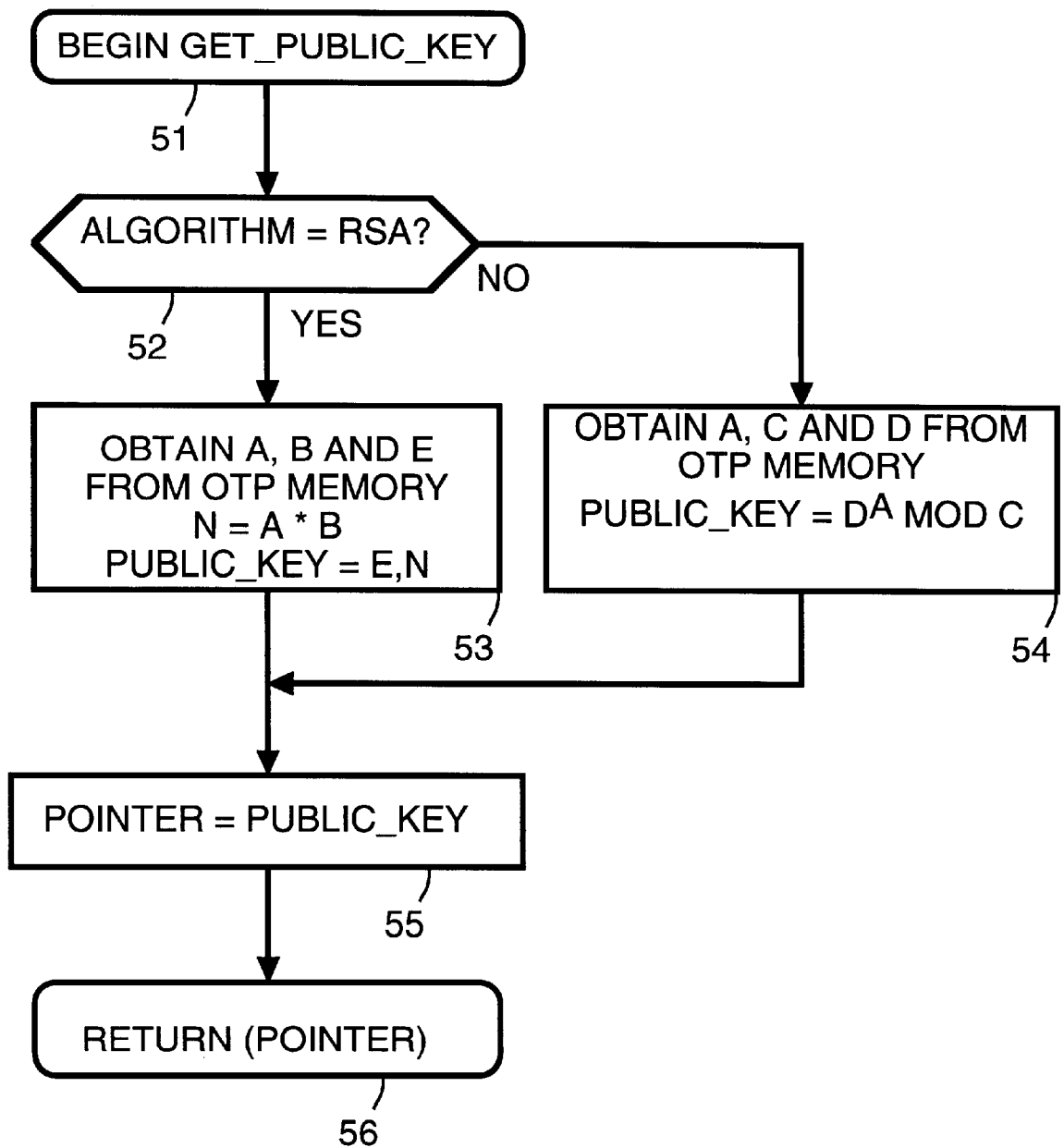
FIG. 5 is a flowchart of a primitive which is used by an application to obtain a public key in accordance with a preferred embodiment of the present invention.

FIG. 5 is a flowchart of a primitive which implements the routine Get_Public_Key (Algorithm, Pointer). In a step 51 the routine Get_Public_Key begins. In a step 52, a check is made to determine whether the parameter Algorithm is equal to RSA. If the parameter Algorithm is equal to RSA, in a step 53, value a is obtained from section 31 of OTP memory 30, value b is obtained from section 32 of OTP memory 30 and value e is obtained from section 35 of OTP memory 30. The value n is calculated as being equal to the value a multiplied by the value b. The variable Public_Key is set equal to value e, value n. The routine then proceeds to a step 55.

If in step 52 the parameter Algorithm is not equal to RSA, in a step 54, value a is obtained from section 31 of OTP memory 30, value c is obtained from section 33 of OTP memory 30 and value d is obtained from section 34 of OTP memory 30. The variable Public_Key is set equal to the result of the equation $d^a$ mod c. The routine then proceeds to step 55.

In step 55, the parameter Pointer is set equal to the variable Public_Key. In a step 56 the routine Get_Public_Key returns the new value for Pointer.

Figure 6:
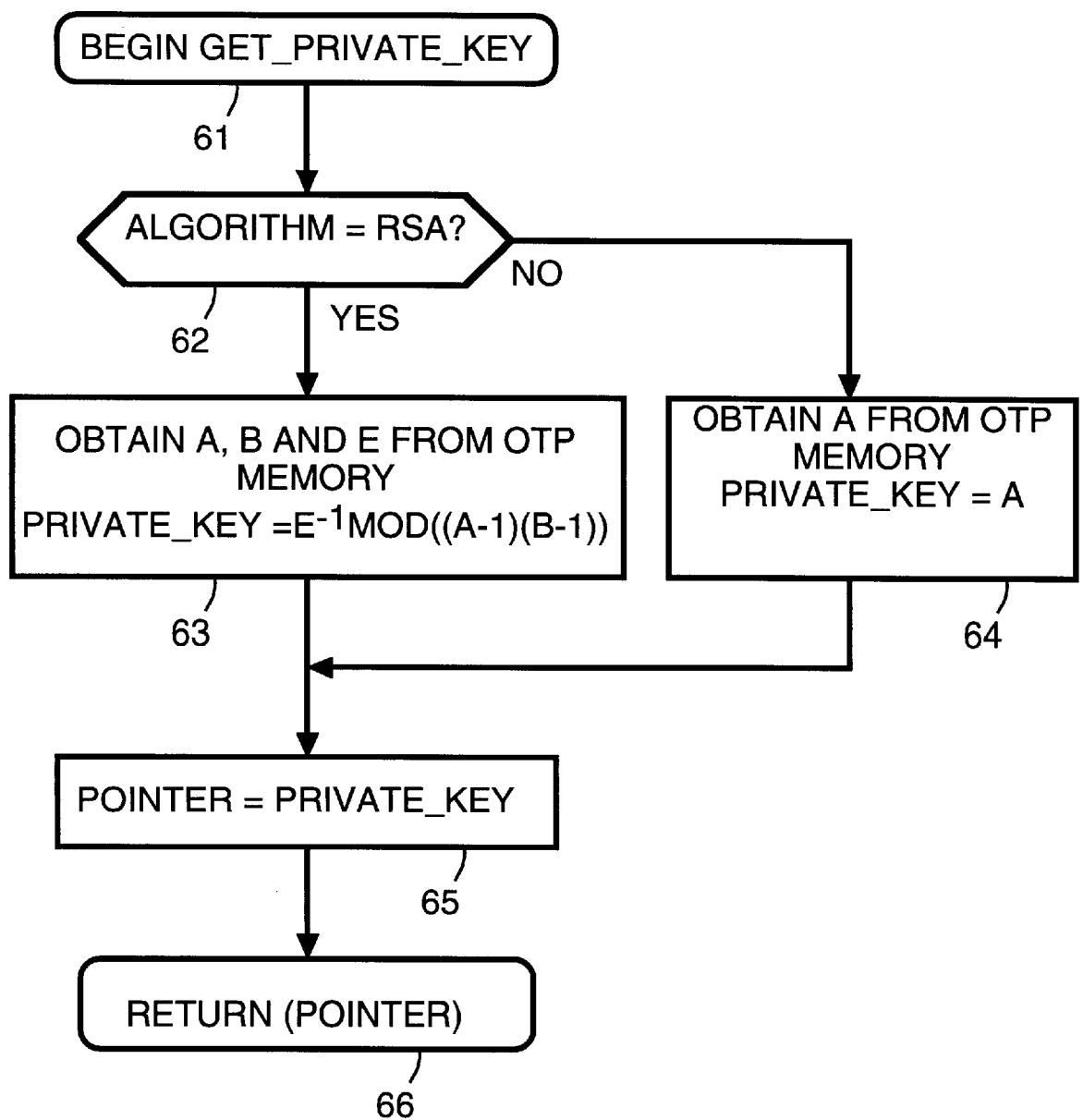
FIG. 6 is a flowchart of an primitive which is used by an application to obtain a private key in accordance with a preferred embodiment of the present invention.

FIG. 6 is a flowchart of a primitive which implements the routine Get_Private_Key (Algorithm, Pointer). In a step 61, the routine Get_Private_Key begins. In a step 62, a check is made to determine whether the parameter Algorithm is equal to RSA. If the parameter Algorithm is equal to RSA, in a step 63, value a is obtained from section 31 of OTP memory 30, value b is obtained from section 32 of OTP memory 30 and value e is obtained from section 35 of OTP memory 30. The value n is calculated as being equal to the value a multiplied by the value b. The variable Private_Key is set equal to o the result of the equation $e^{-1}$ mod ((a-1) (b-1)). The routine then proceeds to a step 65.

If in step 62 the parameter Algorithm is not equal to RSA, in a step 64, value a is obtained from section 31 of OTP memory 30. The variable Private_Key is set equal to value a. The routine then proceeds to step 65.

In step 65, the parameter Pointer is set equal to the variable Private_Key. In a step 66 the routine Get_Private_Key returns the new value for Pointer.

The foregoing discussion discloses and describes merely exemplary methods and embodiments of the present invention. As will be understood by those familiar with the art, the invention may be embodied in other specific forms without departing from the spirit or essential characteristics thereof. For example, the present invention was explained using the RSA cryptographic algorithm and the Diffie-Hellman cryptographic algorithm. However, the present invention applies equally well to other cryptographic algorithms such as the elliptic curve cryptographic algorithm. Likewise, the disclosed embodiments of the present invention used a 2048-bit one time programmable memory for storage. However, memories of other sizes (e.g. 4096) and types (e.g., EEPROM) may also be used in various other embodiments of the present invention. Accordingly, the disclosure of the present invention is intended to be illustrative, but not limiting, of the scope of the invention, which is set forth in the following claims.

We claim:

1. A security integrated circuit comprising:
   a single special memory in which is stored a plurality of values used for a first cryptographic algorithm and used for a second cryptographic algorithm, wherein at least one value from the plurality of values is used in generation of a first key for the first cryptographic algorithm and is also used in generation of a second key for the second cryptographic algorithm; and,
   a library of primitives, including:
      a first primitive which, when the first algorithm is specified performs a first operation for the first cryptographic algorithm using first values from the plurality of values, wherein the first values include the at least one value from the plurality of values used both for the first cryptographic algorithm and for the second cryptographic algorithm, and when the second algorithm is specified, performs a second operation for the second cryptographic algorithm using second values from the plurality of values, wherein the second values include the at least one value from the plurality of values used both for the first cryptographic algorithm and for the second cryptographic algorithm.

2. A security integrated circuit as in claim 1 wherein the single special memory is a one-time programmable memory.

3. A security integrated circuit as in claim 1 wherein the first cryptographic algorithm is the RSA cryptographic algorithm and the second cryptographic algorithm is the Diffie-Hellman cryptographic algorithm.

4. A security integrated circuit as in claim 1 wherein in the first operation obtains a public key for the first cryptographic algorithm and the second operation obtains a public key for the second cryptographic algorithm.

5. A security integrated circuit as in claim 1 wherein the first operation obtains a private key for the first cryptographic algorithm and the second operation obtains a private key for the second cryptographic algorithm.

6. A security integrated circuit as in claim 1 wherein the first operation is an encryption using the first cryptographic algorithm and the second operation is an encryption using the second cryptographic algorithm.

7. A security integrated circuit as in claim 1 wherein the first operation is a decryption using the first cryptographic algorithm and the second operation is a decryption using the second cryptographic algorithm.

8. A method for utilizing multiple cryptographic algorithms comprising the following steps:
   (a) in a single special memory, storing a plurality of values used for a first cryptographic algorithm and used for a second cryptographic algorithm, wherein at least one value from the plurality of values is used in formation of a first key for the first cryptographic algorithm and is also used in formation of a second key for the second cryptographic algorithm;

(b) when performing a first operation for the first cryptographic algorithm using first values from the plurality of values, wherein the first values include the at least one value from the plurality of values used both for the first cryptographic algorithm and for the second cryptographic algorithm; and, (c) when performing a second operation for the second cryptographic algorithm using second values from the plurality of values, wherein the second values include the at least one value from the plurality of values used both for the first cryptographic algorithm and for the second cryptographic algorithm.

9. A method as in claim 8 wherein in step (a) the single memory is a one-time programmable memory.

10. A method as in claim 8 wherein in step (a) the first cryptographic algorithm is the RSA cryptographic algorithm and the second cryptographic algorithm is the Diffie-Hellman cryptographic algorithm.

11. A method as in claim 8 wherein in step (b) the first operation obtains a public key for the first cryptographic algorithm.

12. A method as in claim 8 wherein in step (b) the first operation obtains a private key for the first cryptographic algorithm.

13. A method as in claim 8 wherein in step (b) the first operation is an encryption using the first cryptographic algorithm.

14. A method as in claim 8 wherein in step (b) the first operation is a decryption using the first cryptographic algorithm.

15. A circuit comprising:

a single special memory in which is stored a plurality of values used for a first algorithm and used for a second algorithm, wherein at least one value from the plurality of values is used in formation of a first key for the first cryptographic algorithm and is also used in formation of a second key for the second cryptographic algorithm; and, an interface to the single special memory which, when the first algorithm is specified performs a first operation for the first algorithm using first values from the plurality of values, wherein the first values include the at least one value from the plurality of values used both for the first algorithm and for the second algorithm, and when the second algorithm is specified, performs a second operation for the second algorithm using second values from the plurality of values, wherein the second values include the at least one value from the plurality of values used both for the first algorithm and for the second algorithm.

16. A circuit as in claim 15 wherein the single special memory is a one-time programmable memory.

* * * * *